United States Patent [19]

Fuse et al.

[11] Patent Number: 5,529,318
[45] Date of Patent: Jun. 25, 1996

[54] NON-CONTACTING SHAFT SEALING DEVICE

[75] Inventors: Toshihiko Fuse; Eiji Okumachi, both of Sanda, Japan

[73] Assignee: Nippon Pillar Packing Co., Ltd., Osaka, Japan

[21] Appl. No.: 412,873

[22] Filed: Mar. 29, 1995

[51] Int. Cl.$^6$ ................................................ F16J 15/34
[52] U.S. Cl. ............................... 277/96.1; 277/81 R
[58] Field of Search ................... 277/96.1, 96, 96.2, 277/81 R, 38

[56] References Cited

U.S. PATENT DOCUMENTS

| | | | |
|---|---|---|---|
| 3,640,541 | 2/1972 | Taschenberg | 277/96.1 |
| 5,066,026 | 11/1991 | Heck et al. | 277/96.1 |
| 5,092,612 | 3/1992 | Victor et al. | 277/96.1 |
| 5,201,531 | 4/1993 | Lai | 277/96.1 |

FOREIGN PATENT DOCUMENTS

| | | | |
|---|---|---|---|
| 0581681 | 2/1994 | European Pat. Off. | 277/96.1 |
| 4050559 | 2/1992 | Japan | 277/96.1 |

*Primary Examiner*—Daniel G. DePumpo
*Attorney, Agent, or Firm*—Griffin, Butler Whisenhunt & Kurtossy

[57] ABSTRACT

A non-contacting shaft sealing device in which an even-number of dynamic pressure generating groove groups are arranged in the peripheral direction thereof on a sealing end face of the seal case side or a sealing end face of the rotary shaft side. Each dynamic pressure generating groove group is composed of one or plural shallow L-shaped grooves of a specific groove width comprising a fluid lead-in part extending in the radial direction from a peripheral edge of high pressure side of said sealing end face and a dynamic pressure generating part extending in the peripheral direction from the end portion thereof. When the dynamic pressure generating groove group is composed of plural L-shaped grooves, those L-shaped grooves are arranged close to each other at an equal pitch without crossing each other such that the end portion of each dynamic pressure generating part is positioned on a fourth sealing end face diametral line. Each dynamic pressure generating groove group is symmetrical with respect to each of the adjacent dynamic pressure generating groove groups on both sides thereof around a first sealing end face diametral line passing between those fluid lead-in parts (between the fluid lead-in parts of the outermost side when the dynamic pressure generating groove group is composed of a plurality of the L-shaped grooves) or a second sealing end face diametral line passing between those dynamic pressure generating groove groups.

9 Claims, 12 Drawing Sheets

FIG. 1

NON-CONTACTING SHAFT SEALING DEVICE

The present invention relates to a non-contacting shaft sealing device used in rotary machines such as compressor, turbine and blower, and more specifically to a non-contacting shaft sealing device constructed so that a sealing end face of seal case side and a sealing end face of rotary shaft side may rotate relatively in non-contacting state with an interposing fluid film of a fluid to be sealed at high pressure side.

BACKGROUND OF THE INVENTION

A non-contacting shaft sealing device of this kind, hitherto, is generally constructed as shown in FIG. 12, in which helical dynamic pressure generating grooves 17 are formed parallel on a sealing end face 15a of rotary shaft side in its peripheral direction in order to generate a dynamic pressure (positive pressure) between the sealing end face 15a and the sealing end face of the seal case side at time of relative rotation of the both sealing end faces so that the generated pressure, the back pressure due to the fluid to be sealed acting on the sealing end face of seal case side, and the spring force pressing this sealing end face to the sealing end face 15a of rotary shaft side may be balanced, and the both sealing end faces are held in non-contacting state with a fluid film interposing therebetween.

By such helical dynamic pressure generating grooves 17, however, dynamic pressure is generated only when the rotary shaft or the sealing end face 15a is rotated in normal direction (direction A), but dynamic pressure is not generated between the both sealing end faces when rotated in reverse direction (anti-direction A). It could not be therefore applied in rotary machines that need to rotate the rotary shaft in both normal and reverse directions. Also, in rotary machines in which the rotary shaft thereof is rotated in one direction only, the degree of freedom of designing a device is very small because arrangement of installation of the sealing end face 15a with the dynamic pressure generating grooves 17 being formed thereon will naturally be determined by the rotating direction of the rotary shaft. Further, in a double seal and the like which is arranged side by side with different relative rotation of multiple sealing end faces 15a, an increase in cost results due to an increase in the type of parts since a seal ring formed with pressure generating grooves for rotation in normal direction and a seal ring formed with pressure generating grooves for rotation in reverse direction are necessary. In addition, the two types of seal rings can be mixed easily in handling and there is a possibility of making mistakes in assembly.

BRIEF DESCRIPTION OF THE INVENTION

It is hence a primary object of the invention to present a non-contacting shaft sealing device capable of generating a sufficient dynamic pressure between both sealing end faces for keeping them in non-contacting state whether the relative rotating direction of the both sealing end faces i.e. whether the rotating direction of the rotary shaft is normal direction or reverse direction, and also capable of exhibiting a favorable sealing function not only in a machine for rotating the rotary shaft always in one direction, but also in a machine for rotating in both normal and reverse directions. It is another object of the invention to present a non-contacting shaft sealing device which generates the dynamic pressure under the same conditions regardless of the rotating direction of the rotary shaft, and which is equal in the shaft sealing function whether in normal rotation or in reverse rotation.

It is another object of the invention to present a non-contacting shaft sealing device capable of increasing the degree of freedom of designing the device by having one seal ring for common use in both normal and reverse rotating directions and capable of releasing the restriction on designing due to conditions of machines such as the rotary shaft.

It is a further object of the invention to present a non-contacting shaft sealing device capable of avoiding an increase in cost and a possibility to cause mistakes in assembly without increasing the type of parts even in the case of a double seal and the like.

It is a further object of the invention to present a non-contacting shaft sealing device capable of securing a number of pressure generating spots on the sealing end faces and capable of obtaining easily and positively a sufficient dynamic pressure generated for keeping the both sealing end faces in proper non-contacting state by composing plural L-shaped grooves in the dynamic pressure generating groove groups.

It is a further object of the invention to present, by forming plural independent L-shaped grooves (especially the dynamic pressure generating parts thereof) parallel in the peripheral direction of the sealing end face, a non-contacting shaft sealing device capable of always maintaining and securing favorable shaft sealing conditions, so that the dynamic pressure generated from all the dynamic pressure generating groove groups is not decreased even if any positional relation in the radial direction of both sealing end faces may occur, while a large restoration force is available even if the sealing end face is inclined.

It is a further object of the invention to present, by forming multiple independent L-shaped grooves parallel in the peripheral direction and the radial direction, a non-contacting shaft sealing device, in which if dust or dirt contained in the fluid to be sealed invades and deposits in part of the L-shaped grooves to decrease partially the dynamic pressure generated, the pressure distribution of dynamic pressure generated in the peripheral direction does not become extremely nonuniform on the whole, and lowering or abnormality of shaft sealing function due to defective distribution of pressure does not occur.

The non-contacting shaft sealing device of the invention proposes, in order to achieve the objects, to form even-number sets of dynamic pressure generating groove groups arranged parallel in the peripheral direction, on the sealing end face of seal case side or the sealing end face of rotary shaft side. Thus, in each dynamic pressure generating groove group, one or plural shallow L-shaped grooves of fixed groove width and groove depth composed of fluid lead-in parts extending in the radial direction from the peripheral edge of high pressure side of the sealing end face, and dynamic pressure generating parts extending in the peripheral direction from the end portion of the fluid lead-in parts are disposed. Each dynamic pressure generating groove group is symmetrical with respect to each dynamic pressure generating groove group on both sides thereof around a first sealing end face diametral line passing between those fluid lead-in parts (the outermost fluid lead-in parts when the dynamic pressure generating groove group is composed of plural L-shaped grooves) or a second sealing end face diametral line passing between those dynamic pressure generating groove groups. The groove land ratio $\theta_1/\theta_2$ in the peripheral direction is 0.5 to 0.9, wherein the groove land ratio is the ratio of the angle $\theta_1$ of intersection formed between a third sealing end face diametral line running along those fluid lead-in part of the dynamic pressure generating groove group (the outermost fluid lead-in part when the dynamic pressure generating groove group is composed of plural L-shaped grooves) and a fourth sealing end face diametral line running along the ends of the dynamic pressure generating parts to the angle $\theta_2$ of intersection formed between the fourth sealing end face diametral line of the adjacent dynamic pressure generating groove group which is adjacent to the dynamic pressure generating parts of the aforementioned dynamic pressure generating groove group and the aforementioned third sealing end face diametral line. When each dynamic pressure generating groove group is composed of plural L-shaped grooves, these L-shaped grooves are arranged close to each other at equal pitch without crossing each other, so that the end portion of the dynamic pressure generating parts is positioned on the fourth sealing end face diametral line.

In such a non-contacting shaft sealing device, the number of the dynamic pressure generating groove groups to be formed on one sealing end face is preferably 4 to 24, and the number of L-shaped grooves forming the dynamic pressure generating groove group is preferably 1 to 4. The width of the L-shaped groove is set depending on the sealing conditions, for instance, the diameter of the rotary shaft and others, but generally it is preferably 1 to 4 mm (more preferably 1 to 3 mm). If, however, the rotary shaft diameter is smaller than that used generally, the width of L-shaped groove may be preferably less than 1 mm. The depth of L-shaped groove is also set depending on the sealing conditions, for instance, the rotary shaft diameter and others, but generally it is preferably 2 to 15 µm (more preferably 5 to 10 µm).

In the two adjacent dynamic pressure generating groove groups disposed on both sides of the first sealing end face diametral line, the interval between them in the peripheral direction should be 0.5 to 3 mm, preferably. In each of the dynamic pressure generating groove group, the groove land ratio b/B in the radial direction should be preferably 0.3 to 0.7 (more preferably 0.4 to 0.6) wherein b is the width in the radial direction of the region where the dynamic pressure generating groove groups exist in the sealing region in the annular shape in which both sealing end faces overlap while B is the width of the seal face which is the width in the radial direction of the sealing region. When the dynamic pressure generating groove group is composed of plural L-shaped grooves, the interval in the peripheral direction between the adjacent fluid lead-in parts and the interval in the radial direction between the adjacent dynamic pressure generating parts in each dynamic pressure generating groove group should be preferably both 0.5 to 2.0 mm.

When the sealing end face in which the dynamic pressure generating groove groups are formed (hereinafter called the grooved sealing end face) is rotated relatively, the fluid to be sealed at high pressure side is led into the dynamic pressure generating groove groups from the fluid lead-in parts, and a dynamic pressure (positive pressure) is generated in the terminal end part of the dynamic pressure generating parts extending in the rotating direction (the relative rotating direction with the opposite sealing end face) of the grooved sealing end face from the fluid lead-in parts, and both sealing end faces are held in non-contacting state with an interposed fluid film of the fluid to be sealed at high pressure side.

Incidentally, since even-number sets (of four or more than four sets) of dynamic pressure generating groove groups are arranged close to each other in the peripheral direction and adjacent dynamic pressure generating groove groups are symmetrical in the peripheral direction, all dynamic pressure generating groove groups are classified into one type of dynamic pressure generating groove groups (hereinafter called first dynamic pressure generating groove groups) possessing dynamic pressure generating parts extending in a specific rotating direction (hereinafter called the normal rotating direction) of the grooved sealing end face from the fluid lead-in parts, and another type of dynamic pressure generating groove groups (hereinafter called second dynamic pressure generating groove groups) possessing dynamic pressure generating parts extending in the opposite direction (hereinafter called the reverse rotating direction) of the normal rotating direction from the fluid lead-in parts. That is, except that the adjacent first dynamic pressure generating groove groups and second dynamic pressure generating groove groups extend in different direction the dynamic pressure generating parts, the first and the second pressure generating groove groups compose a set of dynamic pressure generating action part which are identical in the forms of groove, so that plural sets of this dynamic pressure generating action part are arranged close to each other in the peripheral direction at a specific interval.

Therefore, when the grooved sealing end face is relatively rotated in the normal direction, a dynamic pressure is generated in the terminal end part of the dynamic pressure generating part of each first dynamic pressure generating groove group, while when the grooved sealing end face is relatively rotated in the reverse rotating direction, a dynamic pressure is generated in the terminal end part of the dynamic pressure generating part of each second dynamic pressure generating groove group, and, as mentioned above, since the first dynamic pressure generating groove groups and the second dynamic pressure generating groove groups are identical in their forms, the dynamic pressure is generated in the same conditions whether the relative rotation of the both sealing end face is in normal direction or in reverse direction. That is, whether the rotary shaft is rotated in normal direction or reverse direction, an appropriate dynamic pressure can be generated between the both sealing end faces in the same conditions, so that a favorable shaft sealing function may be exhibited.

Incidentally, the pressure acting between the interval of the sealing end faces, that is, the separating force which holds, in the sealing region, the interval between the sealing end faces in non-contacting state is generated in the region (hereinafter called the groove region) where the dynamic pressure generating grooves (first dynamic pressure generating groove groups for rotation in normal direction or second dynamic pressure generating groove groups for rotation in reverse direction) possessing dynamic pressure generating parts extending in the relative rotating direction of the grooved sealing end faces are formed and in the region (hereinafter called the land region) between the dynamic pressure generating groove groups and the dynamic pressure generating groove groups adjacent thereto on the side of the dynamic pressure generating parts, and the pressure distribution of the separating force in the peripheral direction becomes maximum at the terminal end part of the dynamic pressure generating parts of the dynamic pressure generating groove groups, that is, the boundary part of the groove region and the land region, and is decreased almost linearly as the separating force moves away from this boundary part, so that the pressure distribution becomes minimum at the end part in the reverse rotating direction side (the base end part of the dynamic pressure generating parts in the dynamic pressure generating groove groups) of the groove region and at the end part of the land region in the normal rotating direction side (the boundary part from the terminal end part of the dynamic pressure generating parts in second pressure generating groove groups adjacent to the dynamic pressure generating groove groups on the dynamic pressure generating parts thereof). Therefore, the length in the peripheral direction (hereinafter called the groove land length in the peripheral direction) of the groove region and the land region has extremely large influence upon the generation of the above separating force, and how the groove land length in the peripheral direction is set becomes very important in holding the interval between the sealing end faces in proper non-contacting state. The inventor of the invention repeated various experiments and researches on the groove land length in the peripheral direction using the groove land ratio in the peripheral direction of $\theta_1/\theta_2$ as the parameters, and clarified that setting the groove land length in the peripheral direction to $\theta_1/\theta_2=0.5$ to $0.9$ is the essential condition to obtain sufficient separating force capable of holding the interval between the sealing end faces in proper non-contacting state. It is needless to say that, in setting the groove land ratio $\theta_1/\theta_2$ in the peripheral direction, the length in the peripheral direction of the dynamic pressure generating parts is the precondition to secure the approaching distance necessary for the generation of dynamic pressure.

Moreover, when each dynamic pressure generating groove group is composed of plural L-shaped grooves, it is possible to secure many dynamic pressure generating points on the sealing end faces, and to obtain easily and certainly a dynamic pressure generated which is sufficient for holding the both sealing end faces in proper non-contacting state. Moreover, since each L-shaped grooves is independent, the pressure is not decreased from all L-shaped grooves in one dynamic pressure generating groove group even if the positional relation in the radial direction of the both sealing end faces is changed, and the restoration force is large even if the sealing end faces should be inclined. Since it is further possible to form multiple independent L-shaped grooves close to each other in the peripheral direction and the radial direction, if dust or dirt contained in the fluid to be sealed invades and deposits in part of the L-shaped grooves and the dynamic pressure generated should be decreased in part, the pressure distribution of the dynamic pressure generated in the peripheral direction does not become extremely nonuniform on the whole, and lowering or abnormality of shaft sealing function due to defective distribution of pressure does not occur.

BRIEF DESCRIPTION OF THE DRAWINGS

FIG. 1 is a cross sectional view showing non-contacting shaft sealing device according to the invention.

DETAILED DESCRIPTION OF THE INVENTION

Figure 2:
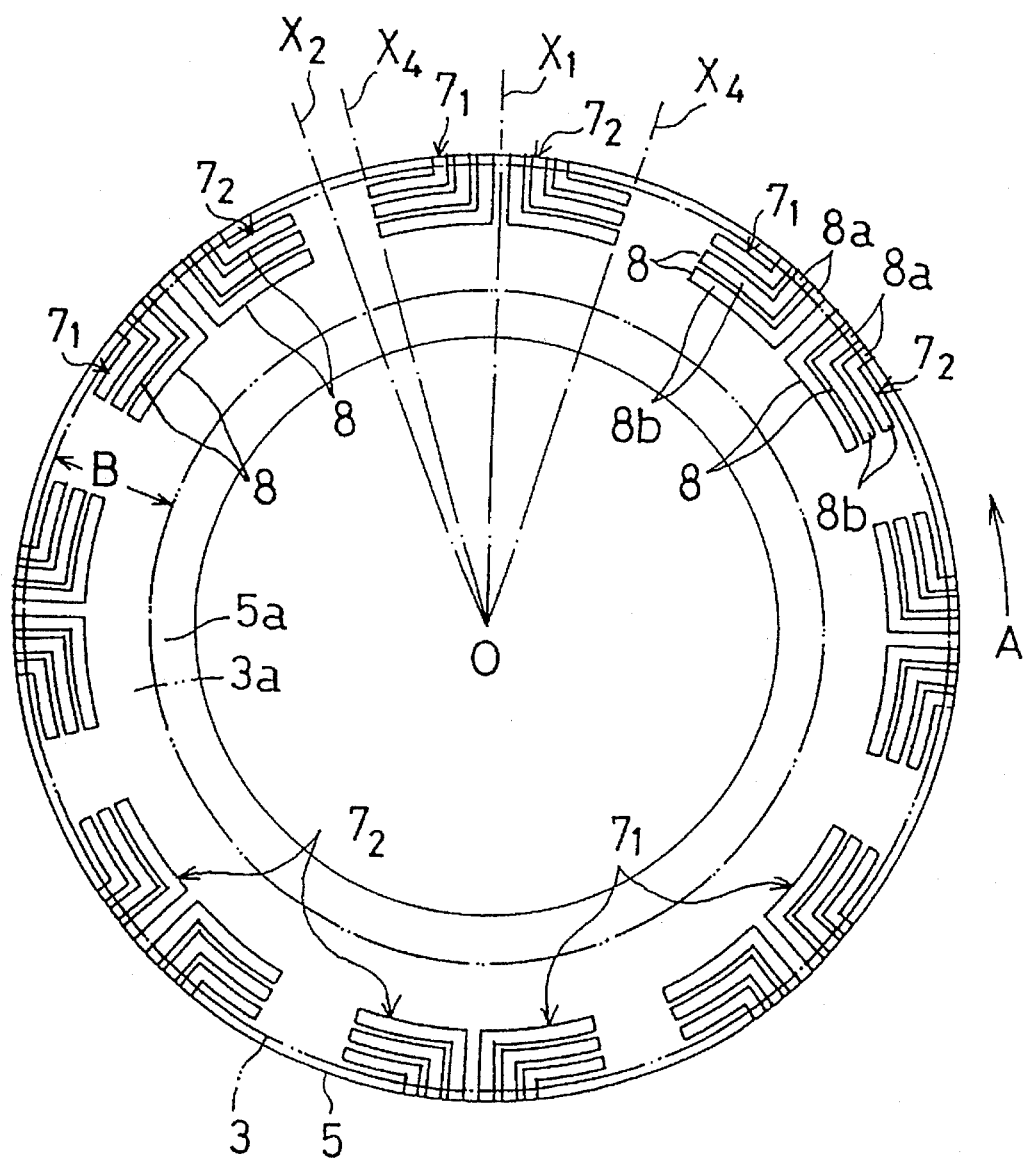
FIG. 2 is a front view showing a sealing end face in which dynamic pressure generating groove groups are formed.

The construction of the invention is described specifically below by referring to embodiments disclosed in FIGS. 1 to 11.

Figure 1:
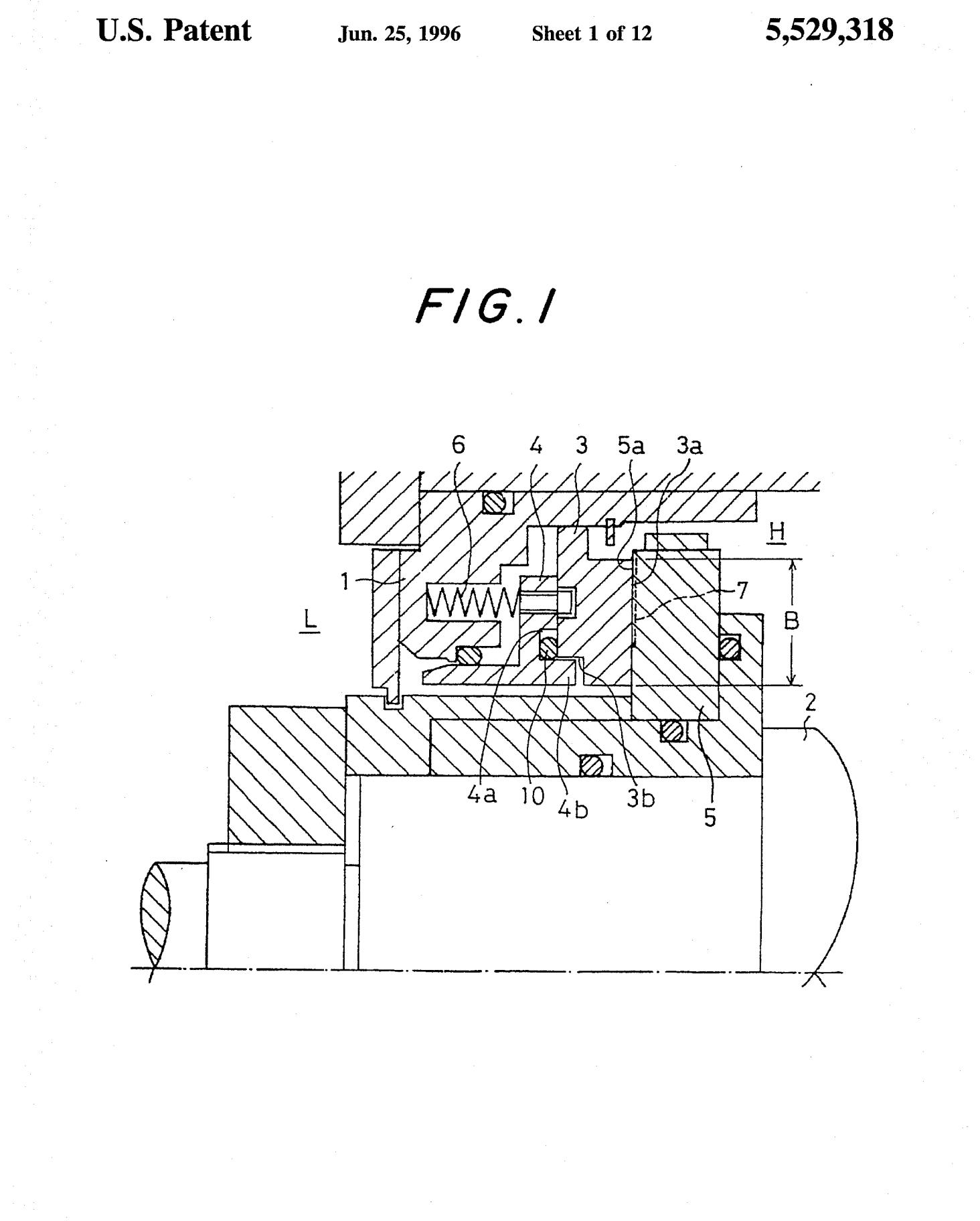

In a non-contacting shaft sealing device shown in FIG. 1, numeral 1 denotes a seal case for partitioning a high pressure side sealed fluid region (for example, high pressure gas region in a machine such as turbine) H, and a low pressure side sealed fluid region (for example, atmospheric region outside the machine such as turbine) L, 2 is a rotary shaft penetrating through the seal case 1, 3 is a stationary sealing ring held in the seal case 1 by a holding ring 4 and slidable in the axial line direction, 5 is a rotary sealing ring fixed on the rotary shaft 2 opposite to the stationary sealing ring 3, and 6 is a spring placed between the seal case 1 and holding ring 4, for pressing and thrusting the stationary seal ring 3 to the rotary seal ring 5. The space between the strationary sealing ring 3 and the holding ring 4 is sealed by an O-ring 10 received in an annular groove 4a of the holding ring 4. The O-ring 10 further works to keep the rings 3 and 4 in non-contact state. An annular protrusion 4b extending from the inner peripheral side wall of the annular groove 4a is formed at the end face of the holding ring 4. The annular protrusion 4b is received, with some clearance, in an annular step portion 3b formed at the inner peripheral portion of the stationary sealing ring 3. That the annular protrusion 4b of the holding ring 4 is received in the annular step portion 3b of the stationary sealing ring 3 serves to prevent the O-ring 10 from projecting in the inner peripheral direction and shifting its position. In this embodiment, the sealing rings 3 and 5 are composed of a material selected properly depending on sealing conditions, but generally, for low pressure, medium and high speed specification, the stationary sealing ring 3 is composed of soft material such as carbon, the rotary sealing ring 5 is composed of hard material such as WC, SiC, other ceramics, cemented carbide, and other alloys, and for high pressure, medium and high speed specification, the both sealing rings 3 and 5 are composed of hard material (for example, the stationary sealing ring 3 is composed of SiC and the rotary sealing ring 5 is composed of SiC or cemented carbide).

Thus, on the rotary side sealing end face 5a which is the end face of the rotary sealing ring 5, as shown in FIGS. 1 to 6, are formed an even-number of dynamic pressure generating groove groups 7 arranged close to each other in its peripheral direction. A dynamic pressure is generated between the rotary side sealing end face 5a and the stationary side sealing end face 3a which is the end face of the confronting stationary sealing ring 3.

Figure 3:
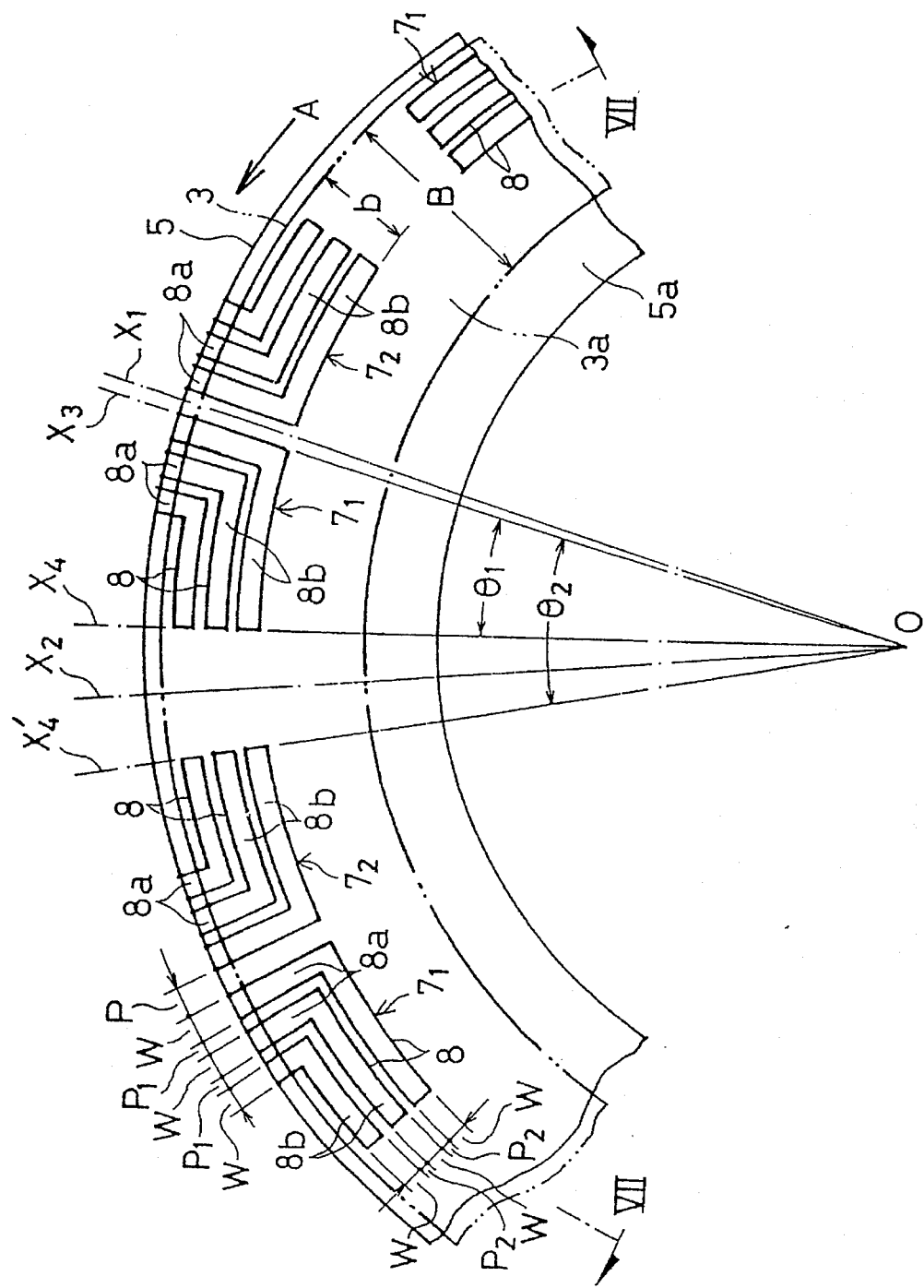
FIG. 3 is a magnified detailed view of part of FIG. 2.
Figure 4:
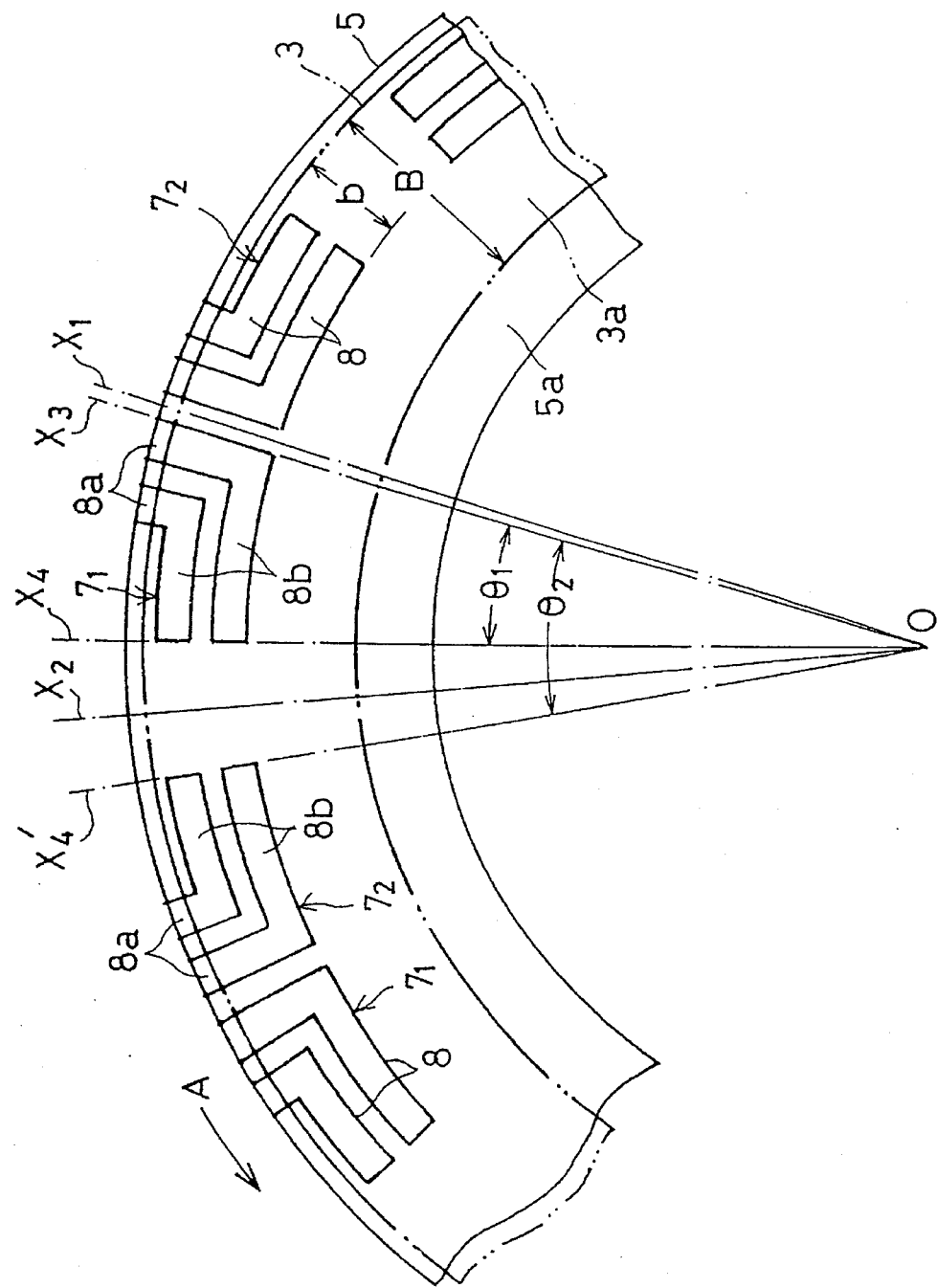
FIG. 4 is a partially cut-away front view of a sealing end face showing other embodiment.
Figure 5:
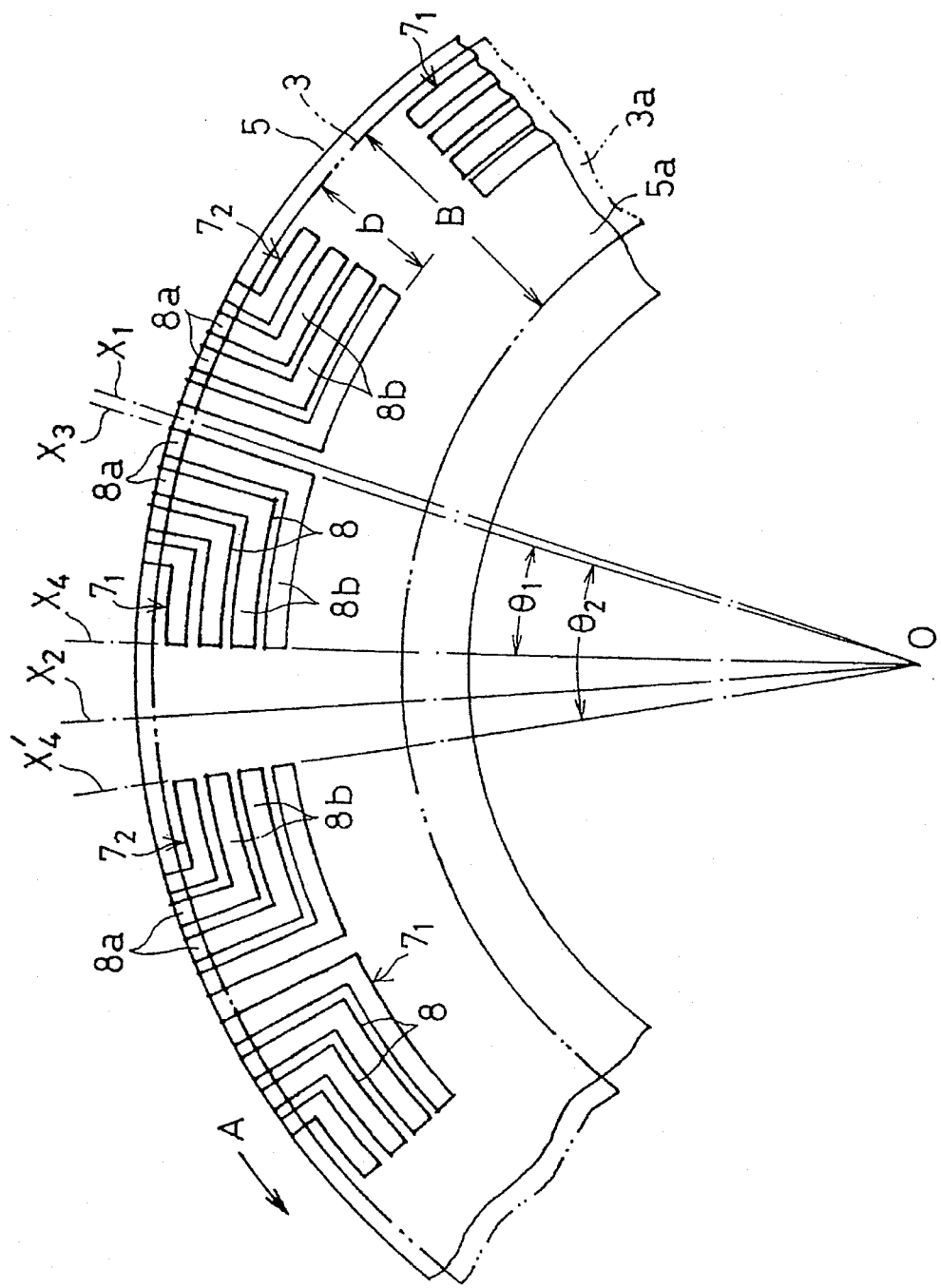
FIG. 5 is a partially cut-away front view of a sealing end face showing a different embodiment.
Figure 6:
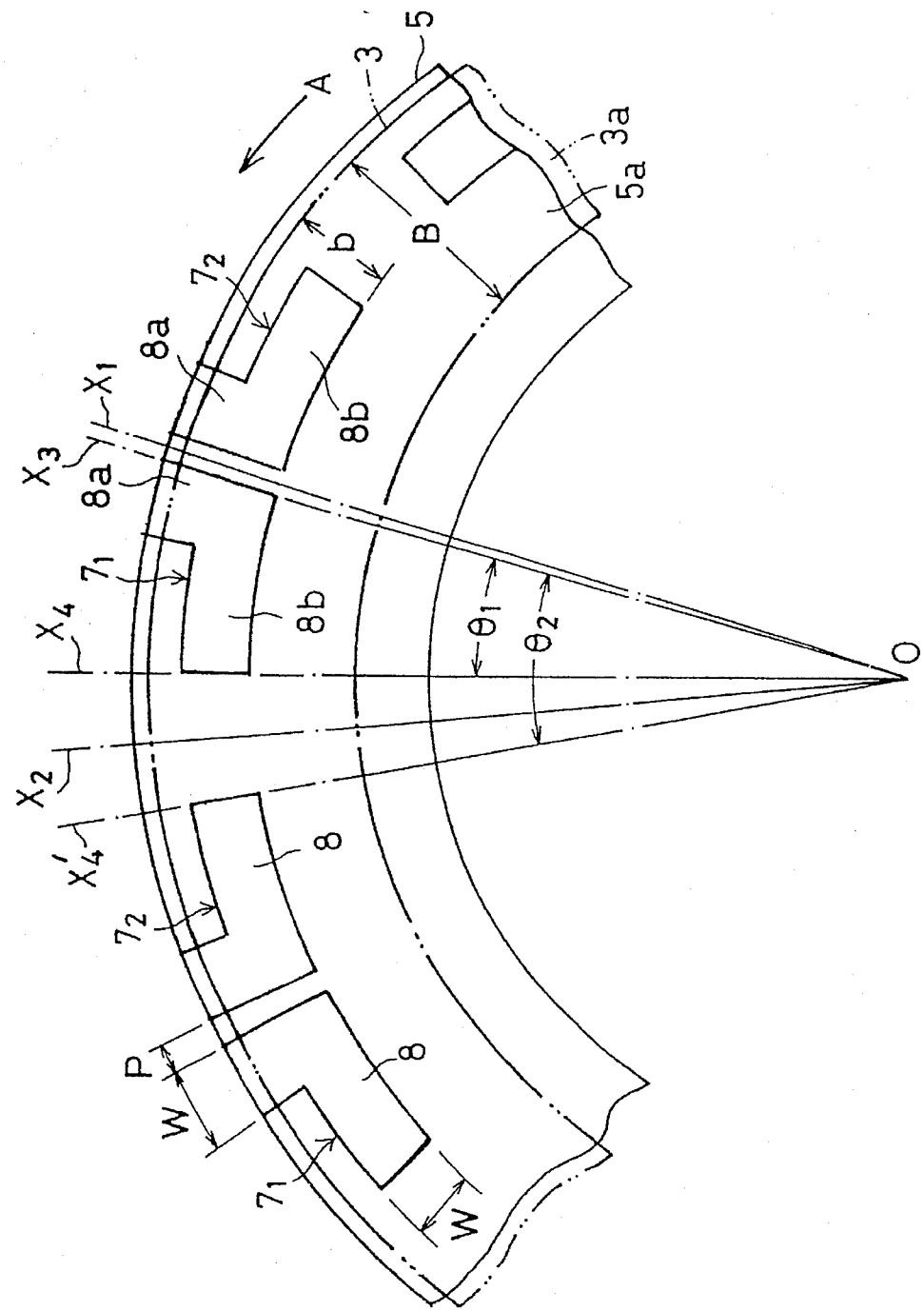
FIG. 6 is a partially cut-away front view of a sealing end face showing a different embodiment.

Each dynamic pressure generating groove group 7, as shown in FIGS. 2 to 6, is composed of a shallow L-shaped groove 8 respectively with a fixed groove depth D and groove width W, comprising a fluid lead-in part 8a extending linearly toward the center 0 of the sealing end face from the outside peripheral edge which is the high pressure side peripheral end edge of the sealing end face 5a and a dynamic pressure generating part 8b extending in the peripheral direction in the form of arc, on the basis of the center 0 of the sealing end face from the terminal end part of the fluid lead-in part 8a. The number of L-shaped groove composing the dynamic pressure generating groove group 7 may be one or plural grooves (2 to 4 grooves preferably), and can be set appropriately depending on the sealing face width B (radial direction width of the sealing region which is the annular region where the sealing end faces 3a and 5a overlap). FIGS. 2 and 3 show an embodiment in which the dynamic pressure generating groove group 7 is composed of three L-shaped grooves 8, FIG. 4 shows an embodiment in which the dynamic pressure generating groove group 7 is composed of two L-shaped grooves 8, FIG. 5 shows an embodiment in which the dynamic pressure generating groove group 7 is composed of four L-shaped grooves 8, and FIG. 6 shows an embodiment in which the dynamic pressure generating groove group 7 is composed of one L-shaped groove 8, respectively.

Needless to say, sealing conditions such as the diameter of the rotary shaft is taken into consideration when setting the number of L-shaped groove 8 which composes the dynamic pressure generating groove group 7.

When the dynamic pressure generating groove group 7 is composed of plural L-shaped grooves 8, as shown in FIGS. 2 to 5, the L-shaped grooves 8 are arranged close to each other at equal pitches in the peripheral direction and radial direction, without crossing each other. That is, the fluid lead-in parts 8a are arranged close to each other at equal pitches and radially toward the center 0 of the sealing end face, and the dynamic pressure generating parts 8b are formed in an arc on the basis of the center 0 of the sealing end face and arranged at equal pitches in the radial direction. The terminal end part of the dynamic pressure generating parts 8b is positioned on the fourth sealing end face diametral line $X_4$.

Meanwhile, the adjacent dynamic pressure generating groove groups $7_1$ and $7_2$ are symmetrical in the peripheral direction as shown in FIGS. 2 to 6. That is, as shown in FIGS. 2 to 6, when each first dynamic pressure generating groove group $7_1$ (or each second dynamic pressure generating groove group $7_2$) is symmetrical with respect to each second dynamic pressure generating groove groups $7_2$ and $7_2$ (or each dynamic pressure generating groove groups $7_1$ and $7_1$) adjacent on both sides thereof around the first sealing end face diametral line $X_1$ passing between those fluid lead-in parts 8a and 8a (between the fluid lead-in parts 8a and 8a on the outermost side when the dynamic pressure generating groove group 7 is composed of 2 to 4 L-shaped grooves 8) or the second sealing end face diametral line $X_2$ passing between those dynamic pressure generating parts 8b and 8b. The first dynamic pressure generating groove group $7_1$ is composed only of the L-shaped groove 8 having the dynamic pressure generating part 8b extending in the normal rotating direction (direction A) from the terminal end part of the fluid lead-in part 8a, and the second dynamic pressure generating groove group $7_2$ is composed only of the L-shaped groove 8 having the dynamic pressure generating part 8b extending in the reverse rotating direction (antidirection A) from the terminal end part of the fluid lead-in part 8a.

Therefore, when the rotary shaft 2 is rotated in the normal direction, a dynamic pressure is generated between the sealing end faces 3a and 5a by the high pressure side sealed fluid introduced into the first dynamic pressure generating groove groups $7_1$, and when the rotary shaft is rotated in the reverse direction, a dynamic pressure is generated between the sealing end faces 3a and 5a under exactly the same conditions as in the normal rotation, by the high pressure side sealed fluid introduced into the second dynamic pressure generating groove group $7_2$. In either case, the generated dynamic pressure, the back pressure acting on the stationary sealing ring 3, i.e. the pressure of the high pressure side sealed fluid acting on the back side of the holding ring 4 and the thrusting force by the spring 6 are balanced, and the both sealing end faces 3a and 5a are held in non-contacting state by an interposing fluid film of the fluid to be sealed at the high pressure side. As the result of this, at the area where the fluid film is formed, that is, the sealing region, the high pressure side sealed fluid region H and low pressure side sealed fluid region L are separated and sealed.

When composing the dynamic pressure generating groove group 7 of a plurality of L-shaped grooves 8, since these L-shaped grooves 8 are independent, the pressure is not released from all L-shaped grooves 8 in one dynamic pressure generating groove group 7 even if the positional relations in the radial direction of the sealing end faces 3a and 5a are changed, and the sealing end faces 3a and 5a can be kept favorably in non-contacting state. In addition, it is possible to provide a large angular rigidity and large restoration force is maintained when the sealing rings 3 and 5 are inclined.

Figure 7:
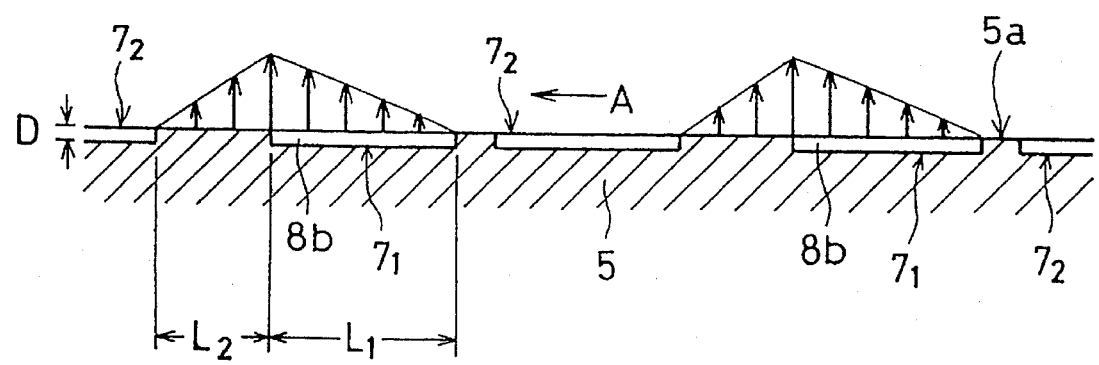
FIG. 7 is a cross sectional view showing conditions of dynamic pressure generation (The cross section is taken along the line VII—VII of FIG. 3).

When the rotary shaft 2 is rotated in normal direction, the separating force between the sealing end faces 3a and 5a is generated, as shown in FIG. 7, in the groove region $L_1$ where the first dynamic pressure generating groove group $7_1$ is formed, and also in the land region $L_2$ between the first dynamic pressure generating groove group $7_1$ and the second dynamic pressure generating groove group $7_2$ adjacent to the dynamic pressure generating part of the groove group $7_1$, the pressure distribution in its peripheral direction becomes maximum in the boundary part of the both regions $L_1$ and $L_2$, and is decreased almost linearly as the separating force moves away from the boundary part, and becomes minimum at the end part of the reverse rotating direction side of the groove region $L_1$ and at the end part of the normal rotating direction side of the land region $L_2$. Such pressure distribution is quite the same when the rotary shaft 2 is rotated in the reverse direction. Therefore, the length in the peripheral direction of the groove region $L_1$ and the land region $L_2$, that is, the groove land length in the peripheral direction have extremely large influence on the generation of the above separating force.

In each embodiment shown in FIGS. 3 to 6, as described above, the groove land length in the peripheral direction is set to $\theta_1/\theta_2=0.5$ to 0.9 (more preferably to 0.5 to 0.7) with the peripheral direction groove land ratio $\theta_1/\theta_2$ used as parameters. That is, the groove land ratio $\theta_1/\theta_2$ is set appropriately in the above-mentioned range depending on the sealing conditions such as the diameter of rotary shaft, wherein as shown in FIGS. 3 to 6, the angle of intersection $\theta_1$ is formed between the third sealing end face diametral line $X_3$ running along the fluid lead-in part (the fluid lead-in part of the outermost side when the dynamic pressure generating groove is composed of 2 to 4 L-shaped grooves 8) 8a of the first dynamic pressure generating groove group $7_1$ (or the second pressure generating groove group $7_2$) and the fourth sealing end face diametral line $X_4$ of the sealing end face running along the terminal end portions of the dynamic pressure generating parts 8b while the angle of intersection $\theta_2$ is formed between the fourth sealing end face diametral line $X'_4$ of the second dynamic pressure generating groove group $7_2$ (or the first dynamic pressure generating groove group $7_1$) which is adjacent to the dynamic pressure generating parts of the first dynamic pressure generating groove group $7_1$ (or the second dynamic pressure generating groove group $7_2$) and the aforementioned third sealing end face diametral line $X_3$.

Needless to say, when setting the peripheral direction groove land ratio $\theta_1/\theta_2$, the number of L-shaped groove 8 composing the dynamic pressure generating groove group 7 is taken into consideration. Generally, if the same number of L-shaped groove 8 is used for composing the dynamic pressure generating groove group 7, the groove land ratio $\theta_1/\theta_2$ in the peripheral direction is almost the same, regardless of the diameter of rotary shaft. Each of the angle of intersection $\theta_1$ and $\theta_2$ is set depending on the sealing conditions such as the diameter of rotary shaft in consideration of the groove land ratio $\theta_1/\theta_2$ in the peripheral direction, but is generally set at $\theta_1=9$ to $17°$ and $\theta_2=14$ to $28°$.

Moreover, in each of the above embodiments, the forming of the dynamic pressure generating groove group 7 is devised so as to exhibit favorably the sealing function including the dynamic pressure generating function.

That is, since the dynamic pressure generating function is exhibited by either the first dynamic pressure generating groove groups $7_1$ or the second dynamic pressure generating groove groups $7_2$, in order to separate the interval of the sealing end faces 3a and 5a equally in the peripheral direction, at least two first dynamic pressure generating groove groups $7_1$ for normal rotation and two second dynamic pressure generating groove group $7_2$ for reverse rotation are necessary. If too many dynamic pressure generating groove groups 7 are formed, the length in the peripheral direction of the dynamic pressure generating part 8a becomes short in connection with the above-mentioned peripheral direction groove land ratio $\theta_1/\theta_2$, and the approaching distance necessary for the generation of dynamic pressure cannot be secured. Therefore, the number of the dynamic pressure generating groove group 7 to be formed is in general, preferably set to 4 to 24 depending on the sealing conditions such as the rotary shaft diameter. The number of the dynamic pressure generating groove group 7 as formed is set to 16 in the example shown in FIG. 2.

If the groove depth of the L-shaped groove 8 is not uniform and is too deep and the pressure difference between both sides of the sealing region (inside diameter side and outside diameter side) is large, leakage of pressure from the deeper groove part increases and the dynamic pressure generating function cannot be exhibited favorably. This also applies to the width of the groove. Therefore, in each of the above embodiments, each L-shaped groove 8 is formed as a shallow groove with a fixed groove depth D and groove width W respectively, and is set to D=2 to 15 μm (to 3 to 10 μm more preferably) and W=1 to 4 mm (to 1 to 3 mm more preferably).

When setting the groove width W and the groove depth D of the L-shaped groove 8, it is needless to say that sealing conditions such as the rotary shaft diameter is taken into consideration. In particular, when the rotary shaft diameter is of a commonly used size, the groove width W of L-shaped groove 8 is preferably set within the range as described above. But, when the rotary shaft diameter is smaller than the commonly used size, it may be preferably set to less than 1 mm (for example, W is set to approximately 0.5 mm). Naturally, in this case, the number of the L-shaped groove 8 composing the dynamic pressure generating groove group 7, and others are also taken into consideration.

In each embodiment shown in FIGS. 3 to 5, the peripheral direction interval $P_1$ between the fluid lead-in parts and the radial direction interval $P_2$ between the dynamic pressure generating parts are both set to 0.5 to 2.0 mm. The interval P in the peripheral direction between the dynamic pressure generating groove groups $7_1$ and $7_2$ which are adjacent to each other and positioned on both sides of the first sealing end face diametral line $X_1$ is set preferably as small as possible in order to increase the number of the dynamic pressure generating groove group 7 to be formed, and is set to 0.5 to 3 mm in each of the above embodiments. Since the fluid lead-in parts 8a extend radially, the above $P_1$ and P change in the radial direction and are not constant (becomes smaller as getting near to the center 0 of the sealing end face), but since the amount of such change is extremely small, there is no problem in setting P and $P_1$ at any position in the radial direction. The position where P and $P_1$ and set is determined appropriately. L-shaped grooves 8 are formed by laser processing, etching processing, shot blast processing or other method.

In order to exhibit the dynamic pressure generating function, in addition to the above-mentioned peripheral direction groove land ratio $\theta_1/\theta_2$, the radial direction groove land ratio b/B becomes an important element, wherein b is the radial direction width of the region part where the dynamic pressure generating groove groups 7 exist in the sealing region while B is the sealing face width which is the radial direction width of the sealing region. In each of the above-mentioned embodiment, the radial direction groove land ratio b/B is set to 0.3 to 0.7 (more preferably to 0.4 to 0.6). The balance ratio is appropriately set depending on the sealing conditions such as the rotary shaft diameter, but is set to 0.7 to 0.9 in each of the above-mentioned embodiments.

The invention is not limited to the above-mentioned embodiment alone, but may be properly changed or modified as far as not departing from the true spirit and principle of the invention.

The L-shaped groove can be formed in a linear groove having an extremely small groove width and the dynamic pressure generating groove group may be composed of a plurality of such L-shaped grooves, as shown in FIGS. 8 to 11.

That is, the embodiment shown in FIGS. 8 to 11 are the same as the above mentioned embodiments with regard to a point (1) that an even-number of dynamic pressure generating groove groups 7' are arranged close to each other in the peripheral direction on the rotation side sealing end face 5a, a point (2) that adjacent dynamic pressure generating groove groups $7'_1$ and $7'_2$ are symmetrical in the peripheral direction, a point (3) that each dynamic pressure generating groove group 7' has plural L-shaped grooves 8' which are arranged close to each other in the radial direction and do not cross each other, and a point (4) that each L-shaped groove 8' comprises a fluid lead-in part 8'a extending linearly in the radial direction and a dynamic pressure generating part 8'b extending in a concentric arc form in the peripheral direction. But, the embodiments in FIGS. 8 to 11 are different from them in that the dynamic pressure generating groove group 7' of the embodiment shown in FIGS. 8 to 11 seek to have as many L-shaped grooves 8' as possible, each L-shaped groove 8' being a linear groove whose groove width W' is less than 1 mm.

The number and groove width of L-shaped groove 8' in each dynamic pressure generating groove group 7', the number and groove width of the dynamic pressure generating part 8'b in particular, are set depending on the sealing conditions such as the diameter of rotary shaft, but they are set so that the groove ratio may generally be set to 0.1 to 0.9 preferably (0.11 to 0.6 more preferably). The groove ratio is the value (a/B) calculated by dividing the radial width of the dynamic pressure generating groove group 7', that is, the radial width a of the region where the dynamic pressure generating parts 8'*b* are arranged close to each other in the radial direction by the width B of the seal face (refer to FIG. 8).

Incidentally, in order to exhibit the dynamic pressure generating function sufficiently, it is necessary, at least, (I) to provide as many L-shaped grooves 8' as possible and (II) to provide the dynamic pressure generating part 8'*b* with a sufficient length for securing an approaching distance necessary for generation of dynamic pressure.

Therefore, it is necessary, in consideration of these points (I) and (II) and the above-mentioned groove ratio, to form the dynamic pressure generating groove group 7' properly depending on the diameter of the sealing end face 5*a*, sealing conditions and other conditions. For example, the interval in the peripheral direction of the fluid lead-in part 8'*a* and the interval in the radial direction of the dynamic pressure generating part 8'*b* should be preferably as small as possible taking the point (I) into consideration. In each embodiment shown in FIGS. 8 to 11, these intervals are set to approximately the groove width W'. The range in the peripheral direction for forming the dynamic pressure generating groove group 7', that is, the angle of intersection $\theta_1$ formed between a third sealing end face diametral line $X_3$ of the sealing end face and a fourth sealing end face diametral line $X_4$ of the sealing end face is also set properly in consideration of (I) and (II), but $\theta_1$ generally should be 5 to 30°, preferably, and in each embodiment shown in FIGS. 8 to 11, the angle of intersection $\theta_1$ is set at 13°. The groove depth D' of the L-shaped groove 8' is set in consideration of the sealing conditions such as the diameter of rotary shaft, but the groove depth D' should generally be 0.1 to 20 μm preferably, and in particular, the groove depth of the dynamic pressure generating part 8'*b* should be 0.1 to 10 μm preferably.

Needless to say, when L-shaped groove 8' is formed in a linear shape, the groove land ratio $\theta_1/\theta_2$ in the peripheral direction, groove land ratio b/B in the radial direction, and groove land length in the radial direction should also be taken into consideration, and the aforementioned same conditions are employed for setting these conditions. As in the case of the above-mentioned L-shaped groove 8, this L-shaped groove 8' is also formed by laser processing, etching processing, and shot blast processing or other method.

Figure 8:
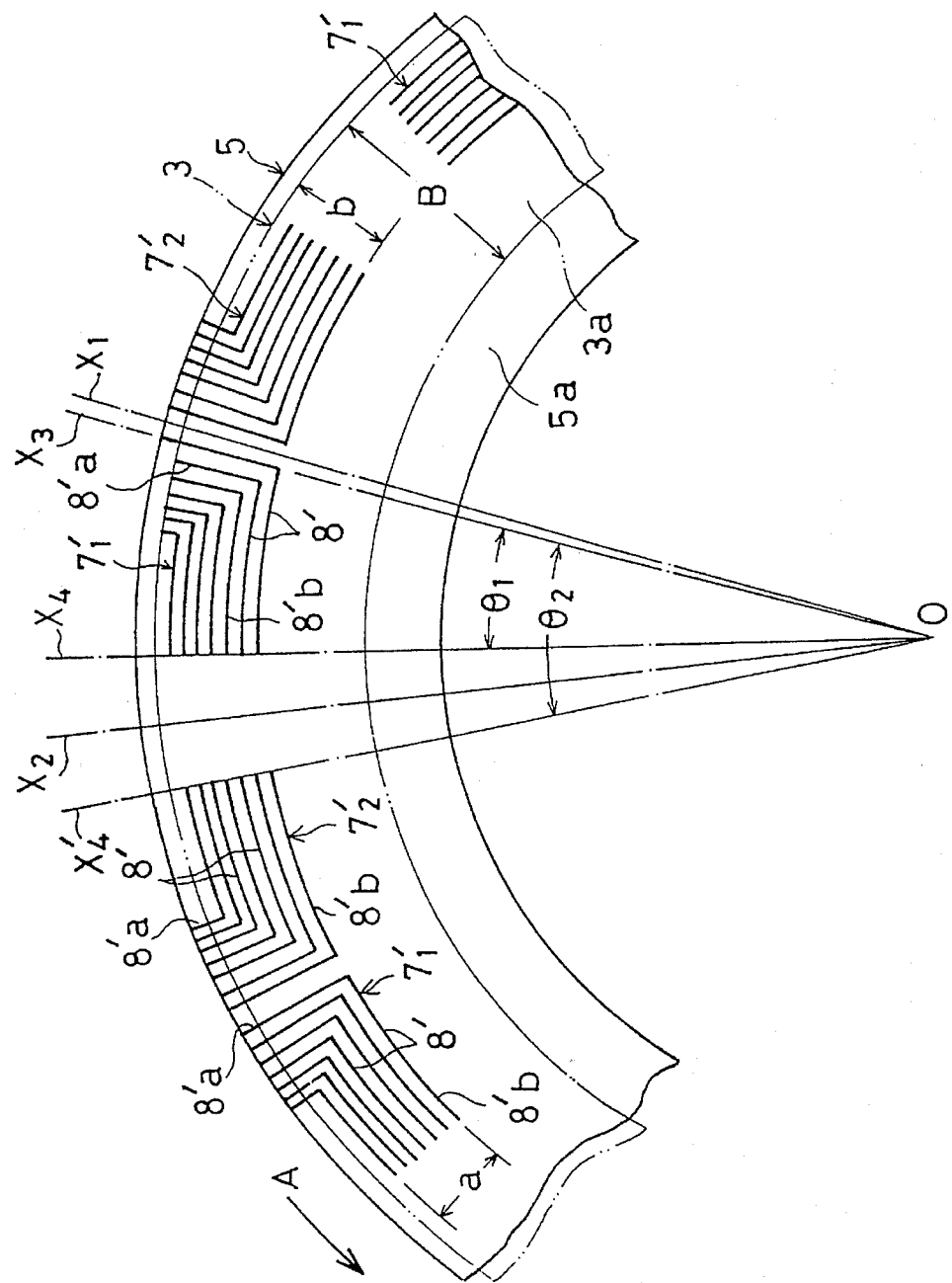
FIG. 8 is a partially cut-away front view of a sealing end face showing a different embodiment.
Figure 9:
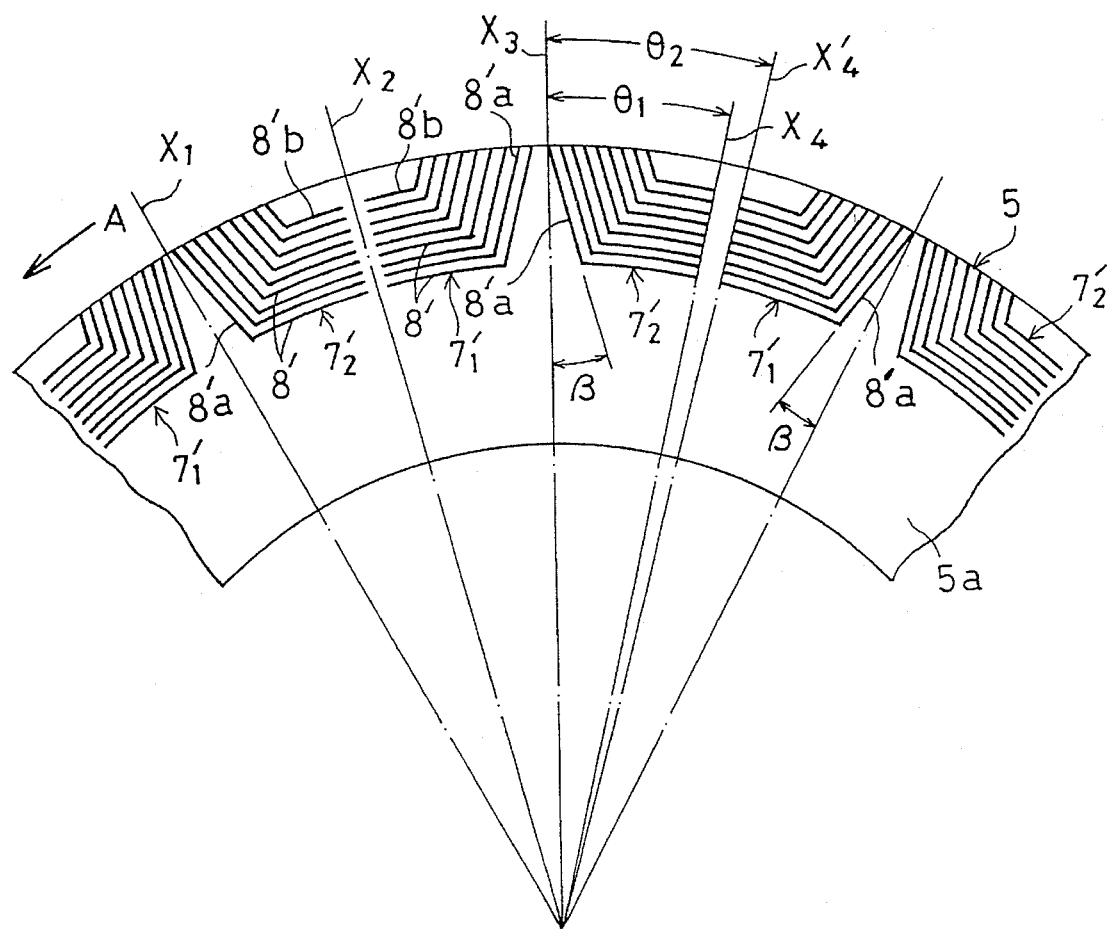
FIG. 9 is a partially cut-away front view of a sealing end face showing a different embodiment.
Figure 10:
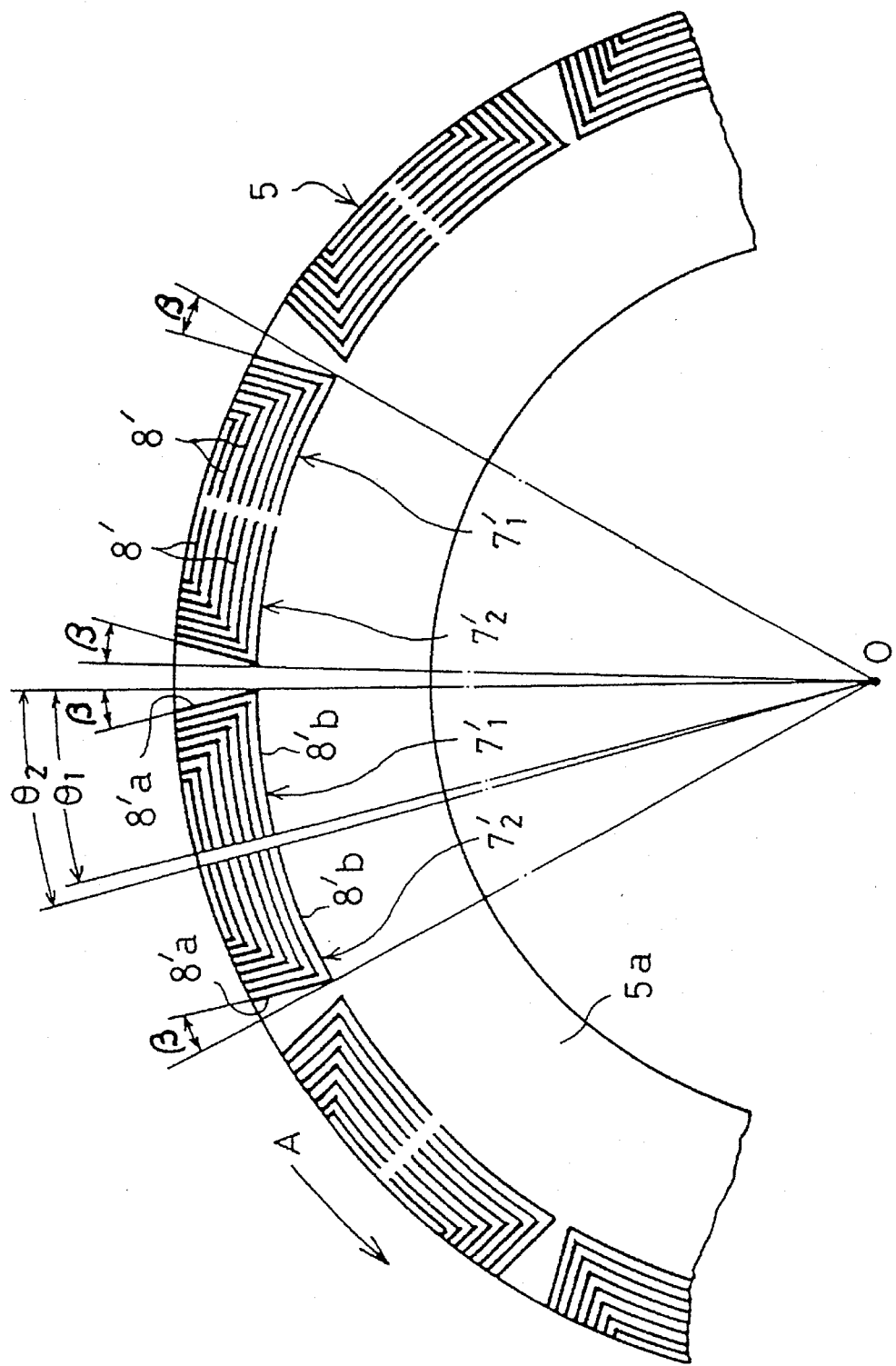
FIG. 10 is a partially cut-away front view of a sealing end face showing a different embodiment.
Figure 11:
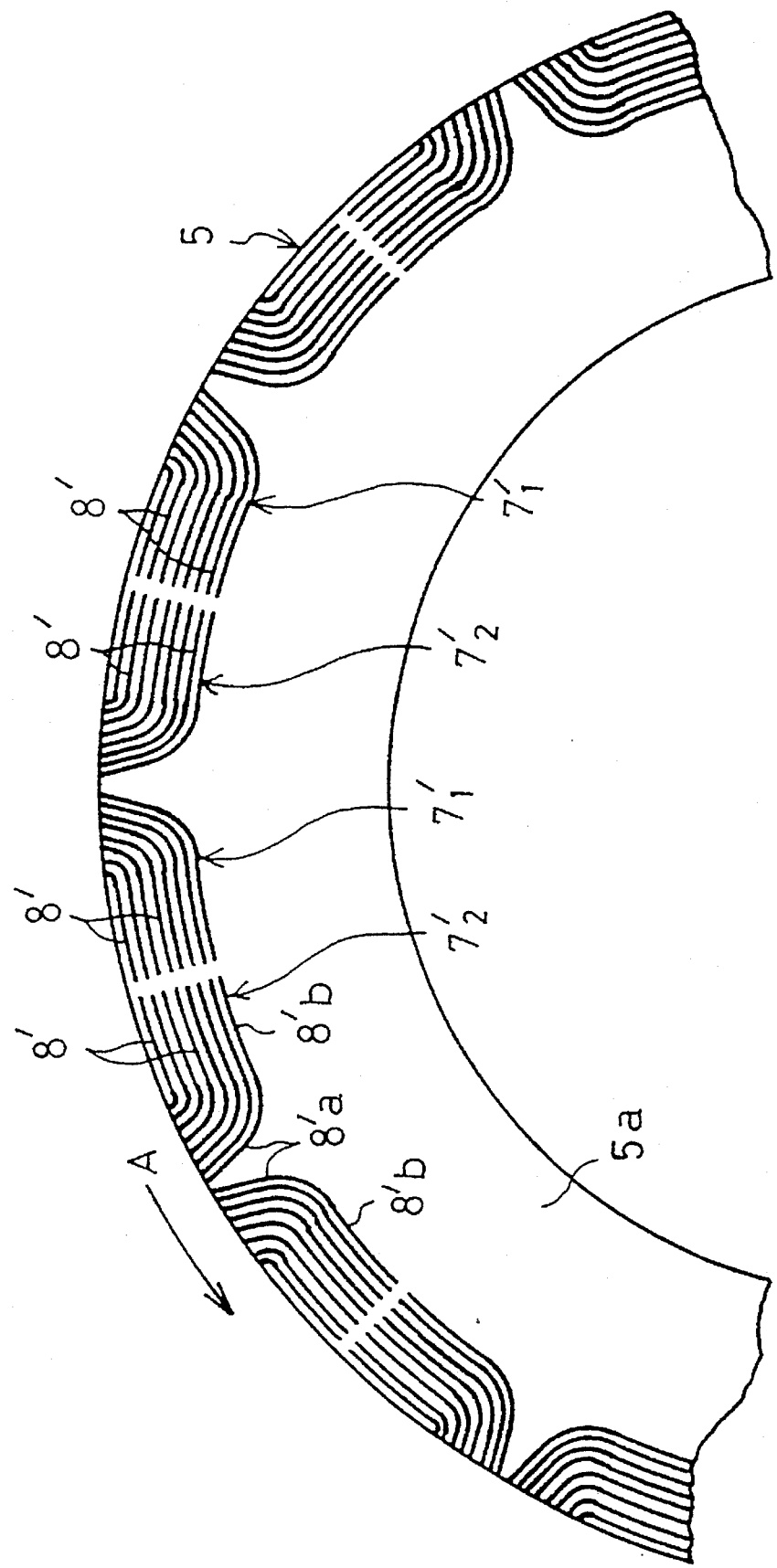
FIG. 11 is a partially cut-away front view of a sealing end face showing a different embodiment.

In the embodiment shown in FIG. 8, the fluid lead-in part 8'*a* is positioned on the diametral line of the sealing end face 5*a*, extending toward the center 0 of the sealing end face, but in the embodiment shown in FIG. 9 or FIG. 10, the fluid lead-in part 8'*a* is inclined by a specific angle β with respect to the diametral line of the sealing end face 5*a*. This inclination angle β should be generally 0 to 45°, preferably. This is because, if β>45°, the fluid lead-in part 8'*a* inevitably becomes longer with the result that either of (I) or (II) must be sacrificed, which may lead to reduction of the generated pressure. In the embodiments shown in FIGS. 9 and 10, the angle β is set to 15°. In FIG. 11, the joining portion connecting the fluid lead-in part 8'*a* and the dynamic pressure generating part 8'*b* is shaped in an arc form. That the fluid lead-in part is inclined by a specific angle and that the joining portion connecting the fluid lead-in part and the dynamic pressure generating part is in an arc form can also be employed for forming L-shaped groove 8 of the above-mentioned embodiments, as well.

Figure 12:
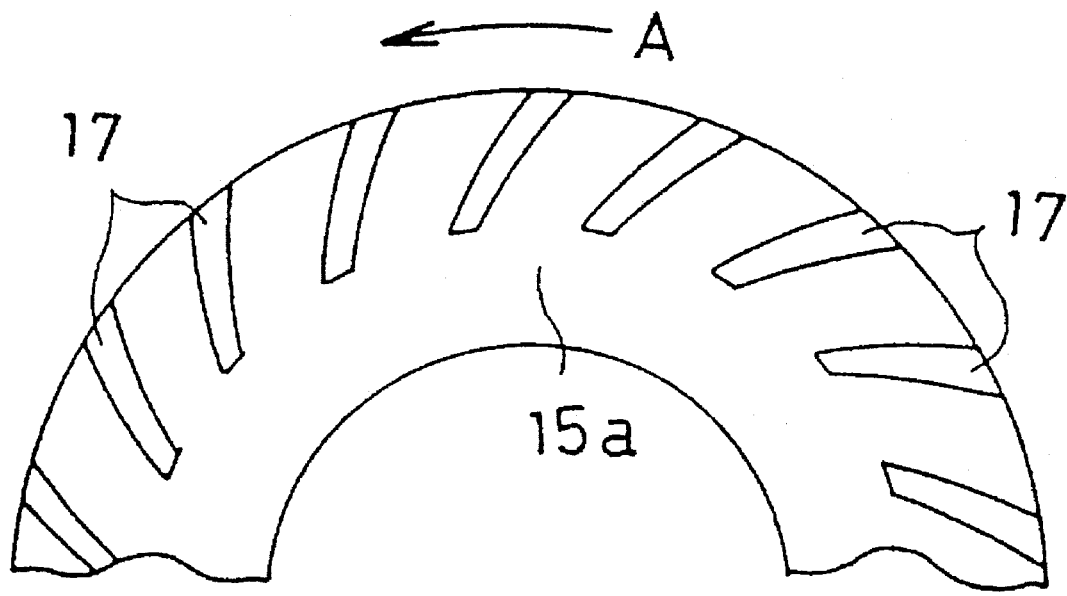
FIG. 12 is a partially cut-away front view of a sealing end face in a conventional non-contacting shaft sealing device.

Incidentally, in FIG. 12, plural dynamic pressure generating regions (the regions where the dynamic pressure generating grooves 17 are formed) are arranged close to each other in the peripheral direction, but in each dynamic pressure generating region, only one dynamic pressure generating groove 17 exists, that is, only one dynamic pressure generating spot exists in each dynamic pressure generating region. Hence, if the dynamic pressure generated in part of the dynamic pressure generating grooves 17 is decreased due to invasion and deposit of dust or dirt, the dynamic pressure generated in the whole dynamic pressure generating region where the clogged dynamic pressure generating groove 17 exists is decreased. Therefore, in such a case as this, the pressure distribution in the peripheral direction may be extremely nonuniform, causing lowering or abnormality of the shaft sealing function.

However, in the embodiments shown in FIGS. 8 to 11, since the L-shaped groove 8' is in the linear shape occupying a very small area, multiple independent L-shaped grooves 8' exist in each dynamic pressure generating region which is the region where each dynamic pressure generating groove group 7' is formed. That is, many independent dynamic pressure generating spots (that is, the dynamic pressure generating parts 8'*b* disposed parallel in the radial direction) exist in each of the dynamic pressure generating regions arranged in the peripheral direction. Therefore, in one dynamic pressure generating region, since there are still many L-shaped grooves 8' (L-shaped grooves which generates proper dynamic pressure) other than such clogged L-shaped groove 8', the dynamic pressure generated in the whole dynamic pressure generating region is hardly decreased, so that the pressure distribution in the peripheral direction may not be extremely non-uniform, even if the dynamic pressure generated in part of L-shaped grooves 8' is decreased due to invasion and deposit of dust or dirt. Such operation and effect may also be exhibited in the embodiment wherein each dynamic pressure groove group 7 is composed of a plurality of L-shaped grooves 8 shown in FIGS. 2 to 5.

Moreover, in each embodiment described above, the dynamic pressure generating groove groups 7 and 7' are formed on the rotation side sealing end face 5*a*, but can also be formed on the stationary side sealing end face 3*a*. However, when the sealing rings 3 and 5 are a combination of the rings made from soft material such as carbon and the rings made from hard material such as ceramics, cemented carbide, and alloys, the dynamic pressure generating groove groups 7 and 7' should be formed preferably with hard material.

What is claimed is:

1. A non-contacting shaft sealing device so constructed that a sealing end face of the seal case side and a sealing end face of the rotary shaft side may rotate relatively in non-contacting state with a fluid film of a high pressure side fluid to be sealed interposed therebetween, wherein an even-number of dynamic pressure generating groove groups are arranged close to each other in the peripheral direction on one sealing end face, each dynamic pressure generating groove group is composed of a plurality of shallow L-shaped grooves each comprising a fluid lead-in part extending on a third sealing end face diametral line in the radial direction from the peripheral edge of the high pressure side of said sealing end face and a dynamic pressure generating part extending in the peripheral direction from the end portion of said fluid lead-in part, the end portion of said dynamic pressure generating part of said L-shaped groove is positioned on a fourth sealing end face diametral line with said L-shaped grooves arranged at an equal pitch and not crossing each other, each dynamic pressure generating groove group is symmetrical with respect to each of adjacent dynamic pressure generating groove groups on both sides of said dynamic pressure generating groove group around a first sealing end face diametral line passing between said fluid lead-in parts of said dynamic pressure generating groove groups and around a second sealing end face diametral line passing between said dynamic pressure generating groove groups, and the groove land ratio $\theta_1/\theta_2$ in the peripheral direction is 0.5 to 0.9 in which the groove land ratio is the ratio of the angle of intersection $\theta_1$ formed between said third sealing end face diametral line passing between said fluid lead-in parts of the outermost side and said fourth sealing end face diametral line on which the end portion of said dynamic pressure generating part thereof is positioned to the angle of intersection $\theta_2$ formed between said fourth sealing end face diametral line of said adjacent dynamic pressure generating groove group which is adjacent to said dynamic pressure generating parts of said dynamic pressure generating groove group and said third sealing end face diametral line.

2. A non-contacting shaft sealing device according to claim 1, wherein each dynamic pressure generating groove group is composed of 2 to 4 L-shaped grooves.

3. A non-contacting shaft sealing device according to claim 1, wherein, in each dynamic pressure generating groove group, the interval in the peripheral direction between said adjacent fluid lead-in parts of said adjacent L-shaped grooves and the interval in the radial direction between said adjacent dynamic pressure generating parts are respectively 0.5 to 2.0 mm.

4. A non-contacting shaft sealing device according to claim 1, wherein, in each L-shaped groove, said fluid lead-in part is a linear shape extending along the diametral line of said sealing end face, and said dynamic pressure generating part is in an arc form centered on the center of said sealing end face.

5. A non-contacting shaft sealing device according to claim 1 wherein the groove width of each L-shaped groove is less than 1 mm and the groove depth is 0.1 to 20 μm.

6. A non-contacting shaft sealing device according to claim 1, wherein 4 to 24 dynamic pressure generating groove groups are formed in one sealing end face.

7. A non-contacting shaft sealing device according to claim 1, wherein the groove width of each L-shaped groove is 1 to 4 mm, and the groove depth is 2 to 15 μm.

8. A non-contacting shaft sealing device according to claim 1, wherein the peripheral direction interval between said adjacent dynamic pressure generating groove groups between which said first sealing end face diametral line passes is 0.5 to 3 mm.

9. A non-contacting shaft sealing device according to claim 1, wherein the groove land ratio b/B in each dynamic pressure generating groove group is 0.4 to 0.6 in which the ratio is obtained by dividing the radial width b of a region where said dynamic pressure groove group exists in a sealing region of an annular region where both sealing end faces overlap by a sealing face width B which is the radial width of said sealing region.

* * * * *